US010404135B2

(12) United States Patent
Rubin

(10) Patent No.: US 10,404,135 B2
(45) Date of Patent: Sep. 3, 2019

(54) HIGH TORQUE DENSITY ELECTRIC MOTOR AND/OR GENERATOR

(71) Applicant: Indiana University Research and Technology Corporation, Indianapolis, IN (US)

(72) Inventor: Matthew J. Rubin, Indianapolis, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 196 days.

(21) Appl. No.: 15/549,659

(22) PCT Filed: Feb. 8, 2016

(86) PCT No.: PCT/US2016/016978
§ 371 (c)(1),
(2) Date: Aug. 8, 2017

(87) PCT Pub. No.: WO2016/130467
PCT Pub. Date: Aug. 18, 2016

(65) Prior Publication Data
US 2018/0048213 A1 Feb. 15, 2018

Related U.S. Application Data

(60) Provisional application No. 62/114,535, filed on Feb. 10, 2015.

(51) Int. Cl.
*H02K 7/12* (2006.01)
*H02K 1/06* (2006.01)
(Continued)

(52) U.S. Cl.
CPC ............. *H02K 7/12* (2013.01); *H02K 1/06* (2013.01); *H02K 1/325* (2013.01); *H02K 9/19* (2013.01);
(Continued)

(58) Field of Classification Search
CPC .... H02K 7/12; H02K 1/325; H02K 9/19; H02K 2201/03; H02K 2213/09; H02K 21/14; H02K 1/06
See application file for complete search history.

(56) References Cited

U.S. PATENT DOCUMENTS 2,832,908 A 4/1958 Abbott
3,200,277 A 8/1965 Kober
(Continued)

FOREIGN PATENT DOCUMENTS

CA 2576182 A1 7/2008
DE 10 2014 001 263 B4 6/2017
(Continued)

OTHER PUBLICATIONS

International Search Report and Written Opinion issued by the ISA/US, Commissioner for Patents, dated May 8, 2017 for International Application No. PCT/US2017/017959; 11 pages.
(Continued)

*Primary Examiner* — Emily P Pham
(74) *Attorney, Agent, or Firm* — Faegre Baker Daniels LLP

(57) ABSTRACT

An electric motor is disclosed, comprising a stator and a rotor mounted relative to the stator to form a gap between a surface of the stator and a surface of the rotor, the gap having a width. One of the stator and the rotor is mounted for movement relative to the other of the stator and the rotor about a central axis, and one of the stator and the rotor is mounted for movement relative to the other of the stator and
(Continued)

the rotor along the central axis in response to thermal expansion of at least one of the stator and the rotor to maintain the width of the gap.

21 Claims, 6 Drawing Sheets

(51) Int. Cl.
*H02K 21/14* (2006.01)
*H02K 1/32* (2006.01)
*H02K 9/19* (2006.01)

(52) U.S. Cl.
CPC ......... *H02K 21/14* (2013.01); *H02K 2201/03* (2013.01); *H02K 2213/09* (2013.01)

(56) References Cited

U.S. PATENT DOCUMENTS

| | | | |
|---|---|---|---|
| 3,294,994 A | 12/1966 | Anderson | |
| 3,341,725 A | 9/1967 | Gifford | |
| 3,452,227 A | 6/1969 | Welch | |
| 3,456,139 A | 7/1969 | Newell | |
| 3,530,322 A | 9/1970 | Newell | |
| 4,329,607 A | 5/1982 | Rosain et al. | |
| 4,634,950 A | 1/1987 | Klatt | |
| 4,644,208 A * | 2/1987 | Laing | H02K 1/12 310/157 |
| 4,877,987 A | 10/1989 | Flaig et al. | |
| 5,804,898 A | 9/1998 | Kawai | |
| 6,369,477 B1 | 4/2002 | Bonin | |
| 6,455,975 B1 | 9/2002 | Raad et al. | |
| 6,563,248 B2 * | 5/2003 | Fujita | H02K 1/17 310/154.02 |
| 6,717,323 B1 | 4/2004 | Soghomonian et al. | |
| 7,550,894 B2 * | 6/2009 | Hino | H02K 21/028 310/191 |
| 7,786,646 B2 | 8/2010 | Lu et al. | |
| 7,898,135 B2 * | 3/2011 | Flynn | H02K 1/12 310/157 |
| 2013/0293027 A1 | 11/2013 | Kim et al. | |
| 2013/0293037 A1 * | 11/2013 | Sakamoto | H02K 1/278 310/44 |
| 2013/0337957 A1 | 12/2013 | Vranish | |
| 2014/0184002 A1 | 7/2014 | Levin et al. | |
| 2015/0035405 A1 | 2/2015 | Littlejohn et al. | |

FOREIGN PATENT DOCUMENTS

| | | |
|---|---|---|
| JP | 2009195025 A * | 8/2009 |
| WO | WO 00/70729 | 11/2000 |

OTHER PUBLICATIONS

International Preliminary Report on Patentability issued by The International Bureau of WIPO, Geneva, Switzerland, dated Aug. 15, 2017 for International Application No. PCT/US2016/016978; 5 pages.

International Preliminary Report on Patentability issued by The International Bureau of WIPO, Geneva, Switzerland, dated Aug. 21, 2017 for International Application No. PCT/US2017/017959; 10 pages.

International Search Report and Written Opinion issued by the ISA/US, Commissioner for Patents, dated Apr. 13, 2016, for International Application No. PCT/2016/016978; 6 pages.

* cited by examiner

HIGH TORQUE DENSITY ELECTRIC MOTOR AND/OR GENERATOR

RELATED APPLICATIONS

The present application is a U.S. National Stage Application of International Patent Application No. PCT/2016/016978, filed Feb. 8, 2016, which claims the benefit of U.S. Provisional Patent Application Ser. No. 62/114,535, filed Feb. 10, 2015, and entitled "HIGH TORQUE DENSITY ELECTRIC MOTOR AND/OR GENERATOR," the complete disclosures each of which is expressly incorporated herein by reference.

TECHNICAL FIELD

The present invention generally relates to the field of electromechanical machines, and more particularly, to a device and method for improving the torque density of electric motors and/or generators.

BACKGROUND

Electric motors, or devices for transducing electrical power into mechanical power (or vice versa), have been of commercial interest for many years due to their wide variety of applications ranging from operation of industrial systems to personal appliances. The term "electric motor" as used herein refers to electric motors and electric generators.

The continuous operation torque density of an electric motor for a given type, dimension, and volume, is primarily limited by the ability of the motor to remove heat. The majority of the heat in an electric motor is produced by electrical resistance in the motor windings. Heat in a stator wrapped electric motor is conventionally transferred from the coil windings, through multiple layers of electrical insulation to the stator teeth, through the stator teeth to the stator back-iron, and through the stator back-iron to the stator housing where it may then diffuse into the environment. Poor thermal communication from the coil windings to the environment results in a buildup of heat in the stator slot limiting the amount of torque an electric motor may continuously transduce without causing permanent damage to its components.

High performance electric motors for mobile traction applications, where weight and volume are critical to total system performance, may utilize direct water cooling to increase cooling rates. While this may result in moderate increases in the continuous torque density for a given motor dimension, the tight packing increases total copper weight (a large cost driver for motors) and often requires custom laser welding assembly machines to automate production. In addition, water cooling requires the use of water tight bearings and seals, which may also be a source of system failure.

Thermal buildup in electric motors is exacerbated under high load low RPM applications where a combination of high electrical current, due to low back EMF, and low rotor fan speed often results in coil insulation and motor failure. Unfortunately, many commercial, industrial, and traction applications require high shaft torque at low RPMs.

Heat buildup in an electrical circuit is a function of $i^2R$; therefore, a moderate increase in the electrical current for a given wiring (electrical resistance, R) will result in a significant increase in heat production. $I^2R$ losses in a typical industrial electrical motor account for 40-65% of all motor losses, far higher than any other single source of loss. The electrical current necessary to generate a given field is determined by the permeability of the magnetic circuit. The biggest decrease in magnetic permeability (increase in magnetic reluctance) is the airgap separating the stator and the rotor. Airgaps, typically in the range of 0.004 to 0.010 inches may decrease the relative magnetic permeability of a circuit by over 100 times, therefore requiring 100 times more magnetizing current (in amp-turns) to generate the same field strength. While airgaps are engineered to be as small as possible, machining tolerances limit the minimum tolerance necessary to prevent the collision between the stator and rotor, often referred to as "walling," which will rapidly damage the motor. Conventional motor design has worked for years to optimize the material selection and airgap length based on commercially reasonable manufacturing techniques. Once the reluctance of the magnetic circuit has been optimized then the only source of further performance improvement is decreasing electrical resistance.

Conventional methods of wiring stators using welded precision-formed rectangular wires have recently been developed to increase the ratio of stator slot volume filled by coil windings. These methods have resulted in volumetric slot fill ratios of up to 73%, an increase of 82% over conventional stators with round wire. The larger wire cross-sectional area results in lower electrical resistance and increased thermal conductivity to the stator. Unfortunately, the increased slot fill also prevents fluid, such as water or air, from directly cooling the coil windings, requiring the majority of the heat to be first transferred to the stator before it may diffuse to the environment. The tight packing also increases total copper weight (a large cost driver for motors) and often requires custom laser welding assembly machines to automate production.

Even though electric motors, such as single phase and three phase induction motors, have been commercially produced to exceed 90% thermodynamic efficiency during normal operation, their relatively low torque density for a given power and weight often requires the use of mechanical transmissions, such as gearboxes or belt drives, to increase torque applied to an output shaft. Unfortunately, typical transmission efficiencies range from 40% or less for worm gears, to 90% for single stage properly sized belt or planetary gear transmissions; thereby, decreasing the total electric-gearbox system efficiency to less than 70% during normal use in most applications.

To further complicate matters, higher RPM motors require higher electrical switching rates, which may result in increased losses due to eddy currents formed in the stator and rotor laminations. While thinner laminations may be used to decrease eddy currents, this often adds to the cost of manufacturing and may result in decreased overall field density.

Therefore, in order to further increase the continuous operation torque and power density of electric motors there is a need for new designs that enable more efficient transduction of electrical energy into mechanical energy.

SUMMARY

In one embodiment, the present invention provides an electric motor, comprising: a ferromagnetic stator comprising a plurality of stator teeth each having a mating surface; and a rotor having a plurality of mating surfaces that cooperate with the mating surfaces of the stator teeth; wherein the mating surfaces of the plurality of stator teeth and the plurality of mating surfaces of the rotor are tapered along a central axis of the stator and the rotor; and wherein one of the stator and the rotor is configured to move along the central axis as a result of thermal expansion to maintain a substantially equal gap between the mating surfaces of the plurality of stator teeth and the plurality of mating surfaces of the rotor during operation. One aspect of this embodiment further comprises a spring coupled to the one of the stator and the rotor configured to move along the central axis, the spring applying a biasing force against the one of the stator and the rotor to inhibit movement along the central axis. In some aspects, the mating surfaces of the plurality of stator teeth define a first inner diameter at a first end of the stator and a second inner diameter at a second end of the stator, the first inner diameter being smaller than the second inner diameter. In a variant of this aspect, the plurality of mating surfaces of the rotor define a first outer diameter at a first end of the rotor and a second outer diameter at a second end of the rotor, the first outer diameter being smaller than the second outer diameter. In some aspects of this embodiment, a plurality of fluted surfaces are alternately disposed between the plurality of mating surfaces of the rotor. Some aspects further comprise a lubricant disposed in the gap between the mating surfaces of the plurality of stator teeth and the plurality of mating surfaces of the rotor. In a variant of this aspect, the lubricant is a dry lubricant comprising one of WS2, MoS2 and graphite. In some aspects, the stator further comprises a back-iron, the plurality of stator teeth protruding radially from the back-iron. In a variant of this aspect, the stator teeth are oriented substantially perpendicular to the central axis. In some aspects of this embodiment, the taper of the mating surfaces of the plurality of stator teeth and the plurality of mating surfaces of the rotor is at an angle relative to the central axis within a range of 5 to 85 degrees. In a variant of this aspect, the angle of the taper is within a range of 10 to 80 degrees. In some aspects of this embodiment, the gap is less than approximately 5 microns.

In another embodiment, the present invention provides an electric motor, comprising: a stator having a plurality of teeth separated by a plurality of coil windings wound around a back-iron, the plurality of teeth together defining a curved, inner mating surface that tapers from a large diameter end of the stator to a small diameter end of the stator; and a rotor having a plurality of mating surfaces that together define a curved, outer mating surface that tapers from a large diameter end of the rotor to a small diameter end of the rotor, the rotor being mounted within the stator such that the outer mating surface of the rotor and the inner mating surface of the stator form a gap having a width; wherein the rotor is configured to rotate within the inner mating surface of the stator about a central axis and to move along the central axis away from the small diameter end of the stator as heat causes the outer mating surface to expand radially from the central axis, the movement of the rotor away from the small diameter end of the stator being sufficient to compensate for the expansion of the outer mating surface and maintain the width of the gap. One aspect of this embodiment further comprises a spring coupled to the rotor to bias the rotor toward the small diameter end of the stator. Some aspects further comprise a lubricant disposed in the gap. In some aspects, the plurality of stator teeth protrude radially from the back-iron toward the central axis. In some aspects, the inner mating surface and the outer mating surface taper at an angle relative to the central axis within a range of 10 to 80 degrees.

In yet another embodiment, the present invention provides an electric motor, comprising: a stator; and a rotor mounted relative to the stator to form a gap between a surface of the stator and a surface of the rotor, the gap having a width; one of the stator and the rotor being mounted for movement relative to the other of the stator and the rotor about a central axis; and one of the stator and the rotor being mounted for movement relative to the other of the stator and the rotor along the central axis in response to thermal expansion of at least one of the stator and the rotor to maintain the width of the gap. In one aspect of this embodiment, the surface of the stator tapers from one end of the stator to another end of the stator and the surface of the rotor tapers from one end of the rotor to another end of the rotor. Some aspects further comprise a spring coupled to the one of the stator and the rotor mounted for movement along the central axis to bias the one of the stator and the rotor in a direction opposite the movement along the central axis. Some aspects further comprise a lubricant disposed in the gap.

In another embodiment, the present invention provides a system, comprising: a motor comprising a stator and a rotor mounted relative to the stator to form a gap between a surface of the stator and a surface of the rotor, the gap having a width; one of the stator and the rotor being mounted for movement relative to the other of the stator and the rotor along a central axis in response to thermal expansion of at least one of the stator and the rotor; a pump having an output in fluid communication with the gap, the pump delivering a fluid lubricant to the gap to maintain the width of the gap. In some aspects of this embodiment the surface of the stator tapers from one end of the stator to another end of the stator and the surface of the rotor tapers from one end of the rotor to another end of the rotor. Some aspects further comprise a controller configured to receive a pressure measurement of the fluid lubricant and to control operation of the pump in response to the pressure measurement. In some aspects the rotor includes at least one groove on the surface of the rotor, the groove being in fluid communication with the gap.

It will be appreciated that numerous modifications to the abovementioned embodiments and aspects of the present invention may be made without departing from the scope of the invention as defined in the appended claims. Moreover, any one or more of the above described preferred embodiments could be combined with one or more of the other preferred embodiments to suit a particular application.

Optional and/or preferred features may be used in other combinations beyond those described herein, and optional and/or preferred features described in relation to one embodiment or aspect of the present invention may also be present in another embodiment or aspect of the present invention, where appropriate.

The described and illustrated aspects and embodiments are to be considered as illustrative and not restrictive in character, it being understood that only the preferred aspects and embodiments have been shown and described and that all changes and modifications that come within the scope of the invention(s) as defined in the claims are desired to be protected. It should be understood that while the use of words such as "preferable", "preferably", "preferred" or "more preferred" in the description may suggest that a feature so described may be desirable, it may nevertheless not be necessary and aspects or embodiments lacking such a feature may be contemplated as within the scope of the present invention as defined in the appended claims. In relation to the claims, it is intended that when words such as "a," "an," or "at least one," are used to preface a feature there is no intention to limit the claim to only one such feature unless specifically stated to the contrary in the claim.

BRIEF DESCRIPTION OF THE DRAWINGS

The foregoing embodiments and aspects, and many of the attendant advantages of the present invention will become more readily appreciated as the same become better understood by reference to the following detailed description when taken in conjunction with the accompanying drawings.

Figure 1:
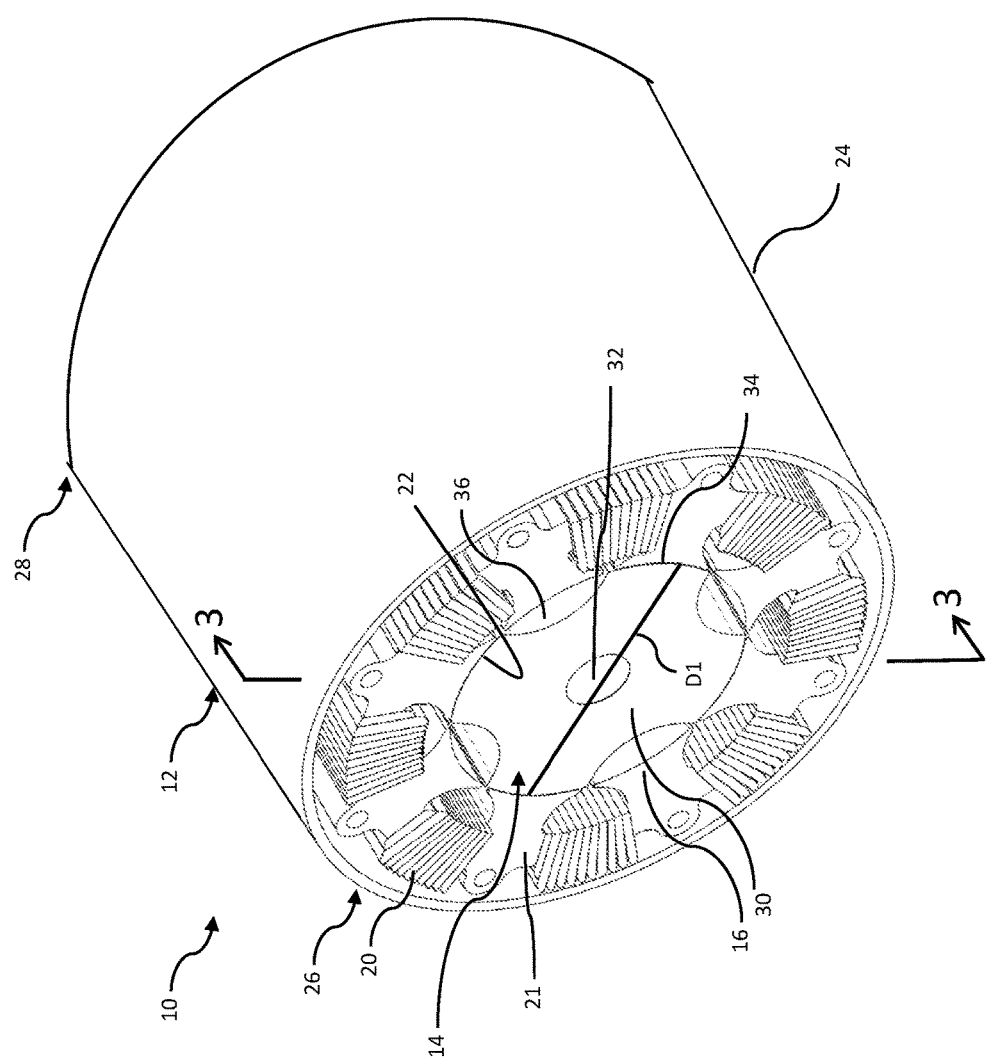
FIG. 1 is a perspective view of an embodiment of an electric motor according to the principles of the present invention.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the present invention, and such exemplifications are not to be construed as limiting the scope of the present invention in any manner.

DETAILED DESCRIPTION OF EMBODIMENTS OF THE PRESENT INVENTION

For the purposes of promoting an understanding of the principles of the present invention, reference will now be made to the embodiments illustrated in the drawings, which are described below. The embodiments disclosed below are not intended to be exhaustive or limit the present invention to the precise form disclosed in the following detailed description. Rather, the embodiments are chosen and described so that others skilled in the art may utilize their teachings. The present invention includes any alterations and further modifications in the illustrated devices and described methods and further applications of the principles taught herein which would normally occur to one skilled in the art to which the present invention relates.

Referring now to FIG. 1, an electric motor according to one embodiment of the present invention is shown. Motor 10 generally includes a stator 12 and a rotor 14, which in many applications is connected to an output shaft (not shown). While in the remainder of this disclosure stator 12 is described as being stationary and disposed outside of rotor 14, which is described as rotating relative to stator 12, it should be understood that the principles of the present invention apply equally to motor configurations wherein the stator is disposed within a rotor which rotates relative to the internally mounted stator. In this embodiment, stator 12 includes a plurality of teeth 16 separated by coil windings 20 which are wound around the stator back-iron 21. Teeth 16 include inwardly directed, curved mating surfaces 22. Stator 12 further includes an outer housing 24 which may enclose the above-described components. As will be understood by those skilled in the art, the above-described components of stator 12 extend substantially from a first end 26 of stator 12 to a second end 28 of stator 12. As is further described below, mating surfaces 22 of stator 12 define an inner diameter D1 at first end 26 of stator 12 that is smaller than an inner diameter D2 (or D2A as depicted in FIG. 3) defined by mating surfaces 22 at second end 28 of stator 12.

Figure 2:
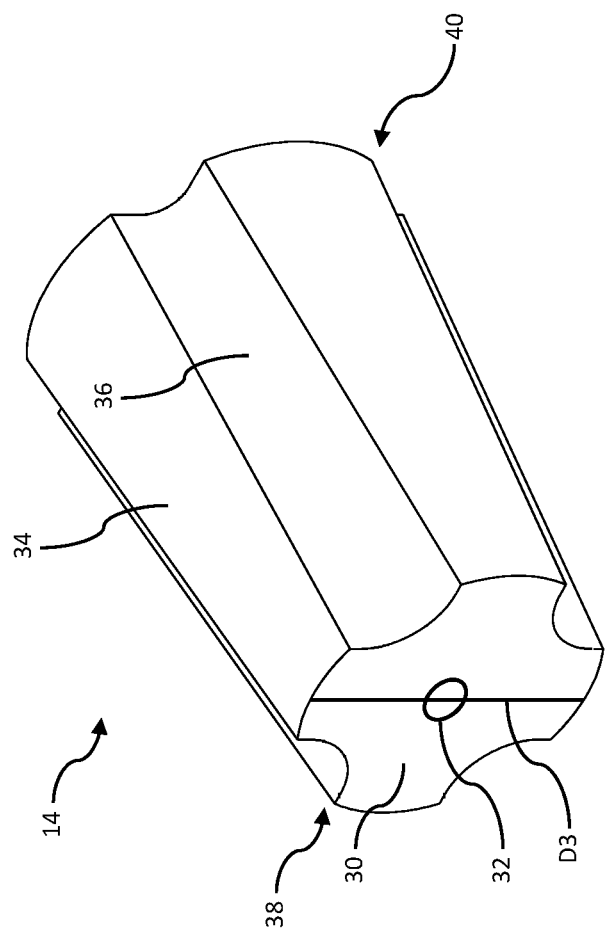
FIG. 2 is a perspective view of a rotor of the embodiment of FIG. 1.
Figure 3:
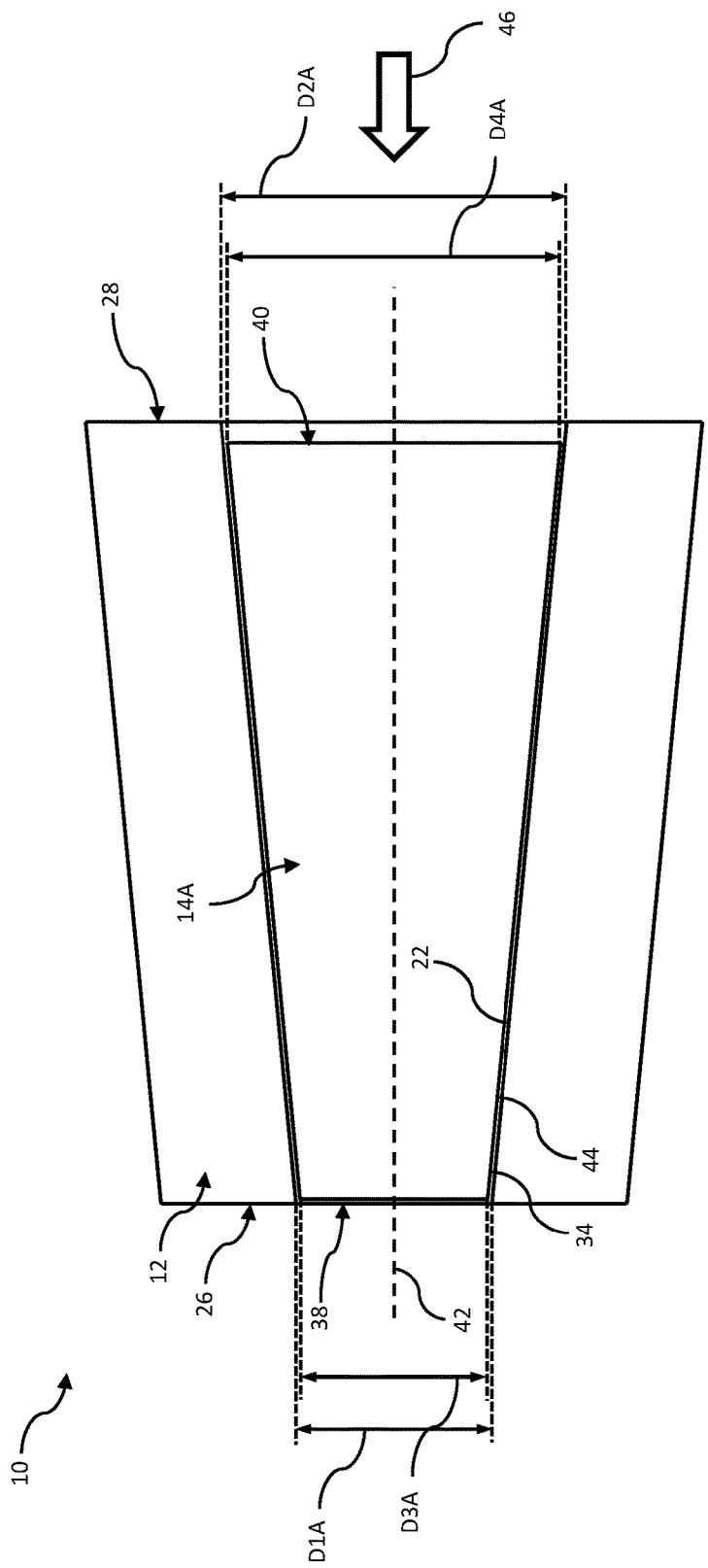
FIG. 3 is a sectional side view taken along line 3-3 of FIG. 1, depicting the rotor of the embodiment of FIG. 1 prior to thermal expansion.

As shown in FIGS. 1-3, rotor 14 includes a body 30 having a central bore 32 and a plurality of outwardly directed mating surfaces 34 optionally separated by fluted surfaces 36. In some embodiments, the outer diameter of rotor 14 is constant. Rotor 14 also includes a first end 38 and a second end 40. Mating surfaces 34 define an outer diameter D3 of rotor 14 at first end 38 that is smaller than an outer diameter D4 defined by mating surfaces 34 at second end 40 of rotor 14.

Referring now to FIG. 3, rotor 14 is shown disposed within stator 12 in a first position prior to the occurrence of thermal expansion (therefore, rotor is designated rotor 14A). In this embodiment, rotor 14A is positioned within stator 12 for rotary movement about a central axis 42. As shown, the outer diameter D3A of mating surfaces 34 of rotor 14A at first end 38 is slightly smaller than the inner diameter D1A of mating surfaces 22 of stator 12 at first end 26. As is also shown, the outer diameter D4A of mating surfaces 34 of rotor 14A at second end 40 is slightly smaller than the inner diameter D2A of mating surfaces 22 of stator 12 at second end 28. As such, a small gap 44 is formed between stator 12 and rotor 14.

As is further described below, as rotor 14 rotates during operation, the components of motor 10 heat up, causing thermal expansion. This thermal expansion causes rotor 14A to increase in diameter radially about axis 42. It should be understood that such thermal expansion may also result in a decrease in the inner diameter of stator 12 (as defined by mating surfaces 22), but the principles of the present invention apply equally to that situation as well. For simplicity, the following disclosure addresses the situation wherein rotor 14A expands. Because of the tapered shape of mating surfaces 22, 34 and lubricant used in gap 44 (as described below), this diametric increase of rotor 14A causes rotor 14A to move longitudinally along axis 42 to the right as depicted in the figure to the position depicted in FIG. 4 to avoid mechanical interference with stator 12. In one embodiment of the present invention, a spring is provided to bias rotor 14A to the left as indicated by arrow 46.

Figure 4:
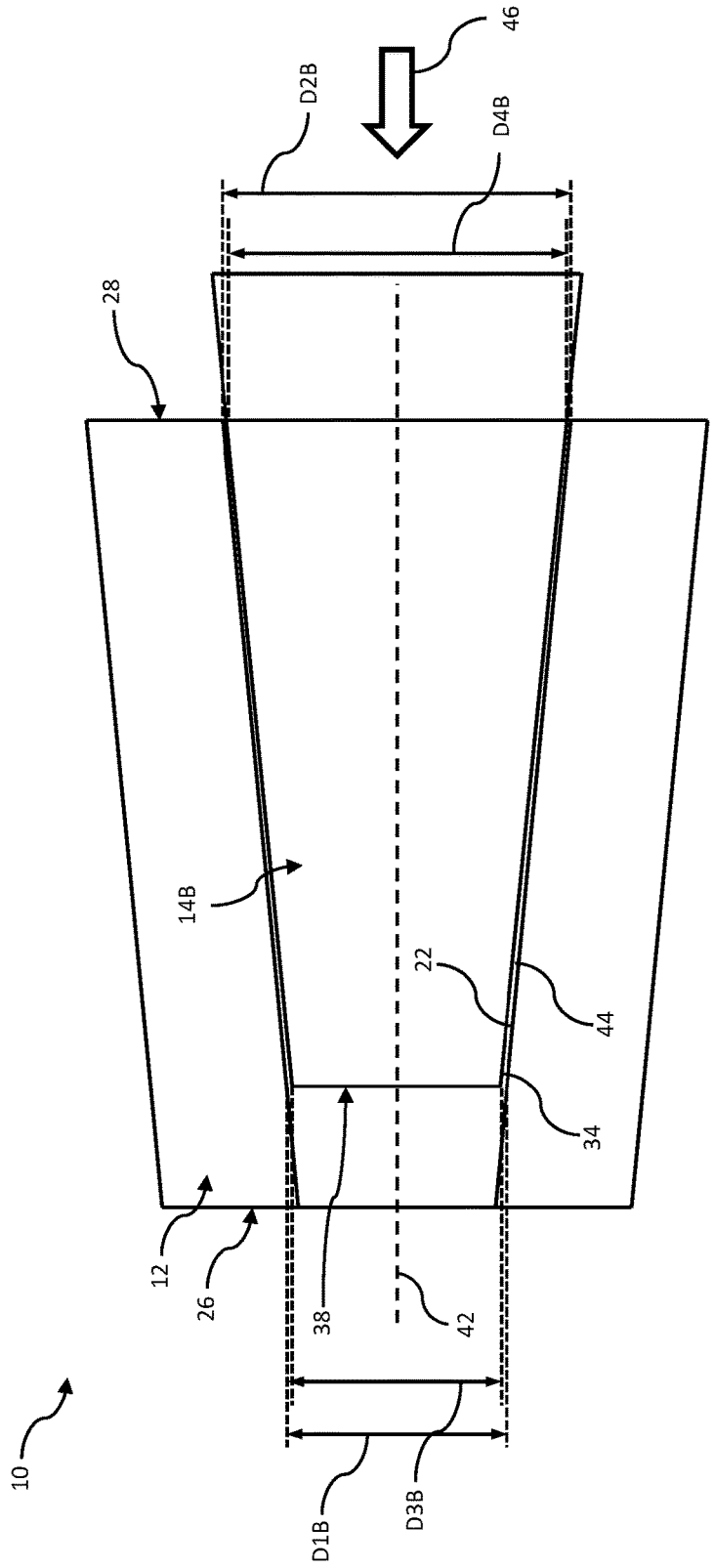
FIG. 4 is a sectional side view taken along line 3-3 of FIG. 1, depicting the rotor of the embodiment of FIG. 1 after thermal expansion.

Referring now to FIG. 4, rotor 14 is shown disposed within stator 12 in a second position after the above-described thermal expansion occurs (therefore, rotor 14 is designated rotor 14B). As shown (and greatly exaggerated for clarity), rotor 14B has moved along longitudinal axis 42 to the right against the biasing force of spring 46 and the magnetic force between rotor 14B and stator 12. Because rotor 14B has expanded in diameter about axis 42, the diameter of rotor 14B at end 38 (i.e., D3B) is larger than the diameter D3A before expansion (FIG. 3). However, because rotor 14B has moved to the new position shown in FIG. 4, where the diameter D1B of stator 12 is larger than the diameter D1A at end 26 of stator 12, the diameter D3B of rotor 14B at first end 38 remains smaller than the diameter D1B of stator 12 at this new location. Similarly, the diameter D4B of rotor 14B at a location on mating surface 34 corresponding to second end 28 of stator 12 is smaller than the diameter D2B at end 28 of stator 12. Consequently, although rotor 14B has increased in size radially about longitudinal axis 42, gap 44 between stator 12 and rotor 14 remains substantially constant before and after thermal expansion because rotor 14B has also moved longitudinally along axis 42 to the position shown in FIG. 4.

As shown in above-described figures, electric motor stator 12 according to one embodiment of the present invention comprises a tapered ferromagnetic stator core, further comprising a stator back-iron 21 and stator teeth 16, coil windings 20 positioned in stator slots in a salient or distributed manner between stator teeth 16 and either wound around stator teeth 16, or poloidaly wound around stator back-iron 21 between stator teeth 16, where coil windings 20 are operationally connected into at least one phase such that coil windings 20 produce opposing magnetic fields in stator 12 when operationally connected to an electric power supply. Pairs of poloidal wound phases may further be operated in opposition to each other to result in magnetic fields at the terminal ends of stator teeth 16.

One of skill in the art will understand that a tapered ferromagnetic stator core of the present invention may comprise a substantially radial geometry with radially oriented stator teeth 16 protruding from back-iron 21 and extending perpendicular to axis 42, a substantially axial geometry with an even number of axially oriented stator teeth 16 protruding from stator back-iron 21 parallel to axis 42, or some combination thereof, such as a 45 degree angle geometry. The above-described taper of stator 12 and rotor 14 is at an angle relative to axis 42 within the range of 5 to 85 degrees, and more preferably 10 to 80 degrees. The tapered geometry uniquely enables a zero or near zero gap 44 or direct contact junction to be maintained between the stator 12 and the rotor 14 faces during operation where thermal expansion and contraction may take place.

During thermal expansion, rotor 14 or stator 12 may move along axis 42 to maintain a zero gap 44, characterized herein as a stator-rotor air gap 44 of less than approximately 5 microns during operation, without seizing. The position of rotor 14 or stator 12 may be further stabilized by utilizing a spring 46 aligned along the axis 42 of rotation. To further enhance the efficiency of motor 10, a dry lubricant, such as WS2, MoS2, or graphite, or a viscous lubricant, such as motor oil, may be used to decrease the coefficient of friction between stator 12 and rotor 14 surfaces. WS2 may be particularly well suited for this application due to its high load performance, ability to operate in oxidative environments, relatively thin lubricious layer (often less than one micron), and its relatively low coefficient of friction (less than 0.03). A dry lubricant may also enable the use of a relatively soft ferromagnetic core material by lubricating, and even embedding itself into the contact surfaces of the ferromagnetic material; thereby, forming an impregnated surface composite.

Various fluid lubricants, such as oil, water or air, may be used in gap 44 of motor 10 to decrease the coefficient of friction between rotor 14 and stator 12. Such viscous, fluid lubricants may also be introduced into gap 44 under positive pressure, thereby further reducing the coefficient of friction by counter-balancing the compressive force generated between rotor 14 and stator 12. In other words, as stator 12 and rotor 14 are drawn toward one another, and as gap 44 tends to decrease with thermal expansion, a pressurized fluid lubricant applies a counter-force, urging stator 12 and rotor 14 away from one another.

Figure 5:
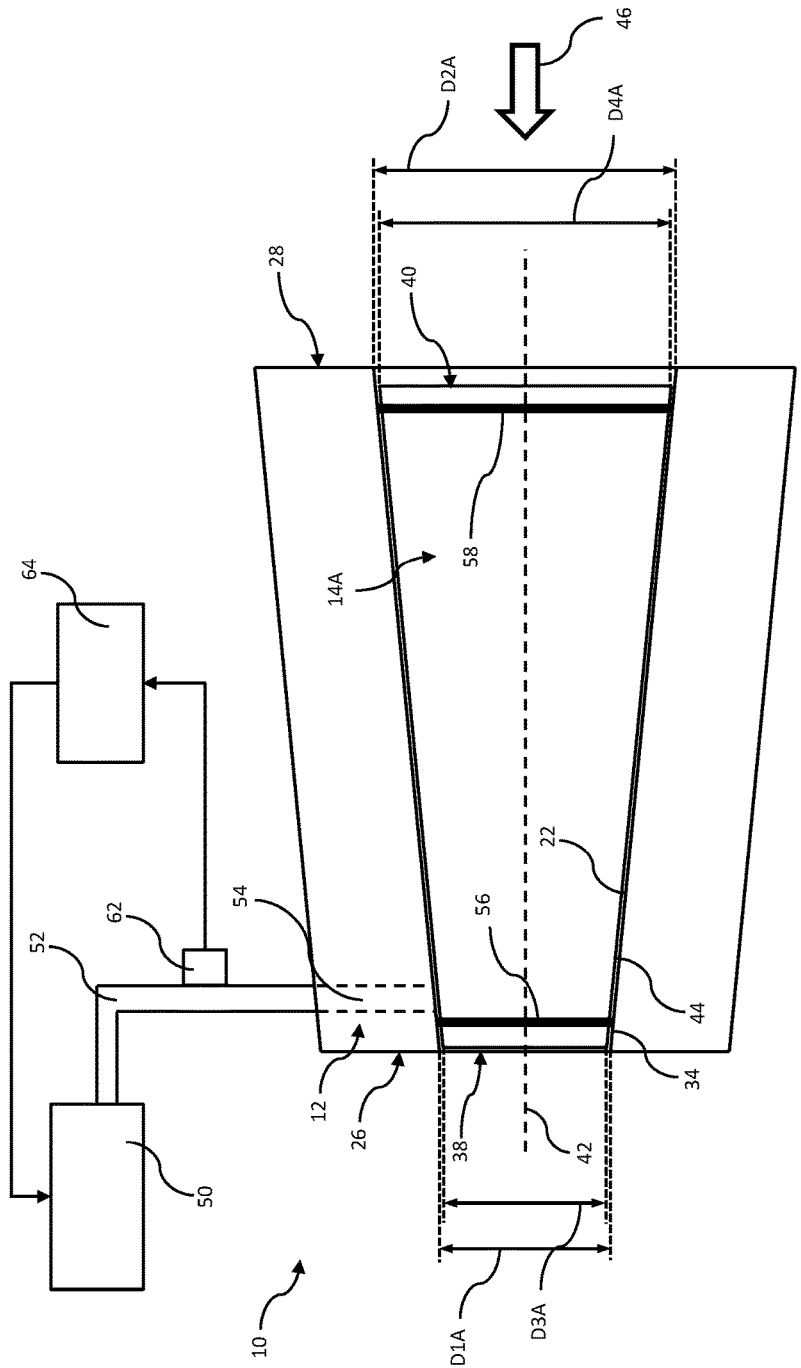
FIG. 5 is a sectional side view depicting an electric motor according to another embodiment of the present invention.

As shown in FIG. 5, in certain embodiments system 10 includes an external pump 50 which delivers fluid lubricant under pressure through a conduit 52, a bore 54 formed in stator 12, and into gap 44. In such an embodiment, rotor 14 or stator 12 may include a first seal 56 disposed adjacent end 38 of rotor 14 and a second seal 58 disposed adjacent end 40 of rotor 14. Seals 56, 58 together contain the pressurized fluid lubricant within gap 44. As show, lubricant is pumped into gap 44 adjacent the tapered end 38 of rotor 14.

Figure 6:
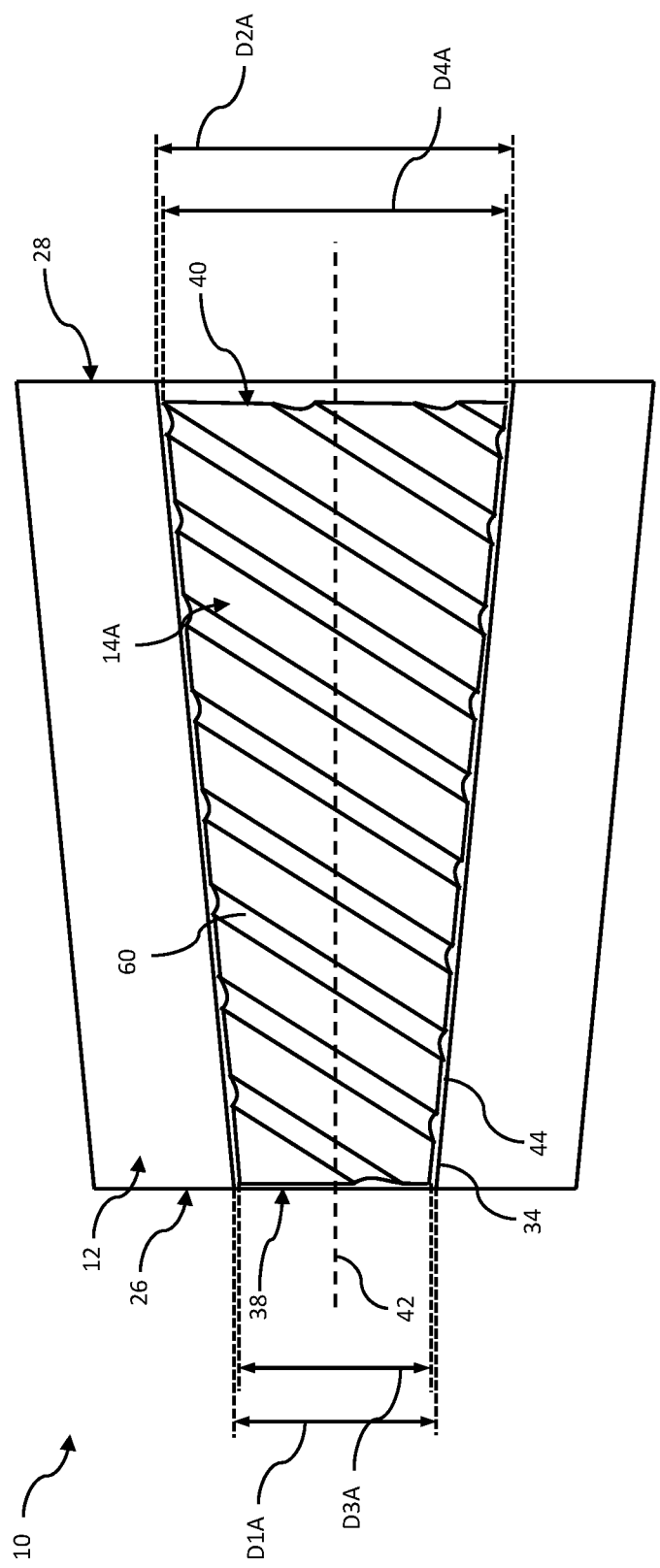
FIG. 6 is a sectional side view depicting an electric motor according to another embodiment of the present invention.

Referring now to FIG. 6, in an alternative embodiment without pump 50, the positive pressure of the lubricant is generated within gap 44 as a result of rotation of rotor 14 using grooves 60 formed in the outer surface of rotor 14 in a helical or screw-like orientation. In variations of this embodiment, grooves 60 may be formed in a herringbone shape. In other embodiments, the positive pressure of the lubricant is generated from the magnetic attraction of a ferrofluid or the like. The positive pressure lubrication may be introduced (such as with pump 50) under a quasi-constant flow rate to provide active damping of rotor 14 to accommodate the dramatic increases in fluid pressure that may result from relatively minor changes in the relative positioning of rotor 14 and stator 12 as a result of thermal expansion. In such an embodiment, and referring back to FIG. 5, a pressure sensor 62 may be configured to measure the pressure of lubricant delivered from pump 50. A controller 64 may be configured to receive pressure measurements from sensor 62 and transmit commands to pump 50 to control the pressure output of pump 50. As used herein, the term controller may refer to an Application Specific Integrated Circuit ("ASIC"), an electronic circuit, a processor (shared, dedicated, or group) and memory that execute one or more software or firmware programs, a combinational logic circuit, and/or other suitable components that provide the described functionality.

In certain embodiments, controller 64 forms a portion of a processing subsystem including one or more computing devices having memory, processing, and communication hardware. Controller 64 may be a single device or a distributed device, and the functions of the controller may be performed by hardware and/or as computer instructions on a non-transient computer readable storage medium. Controller 64 generally includes a logic/processor and memory. In one embodiment, the logic/processor of controller 64 is a microprocessor that includes one or more control algorithms or logic that is generally operable to control and manage the overall operation of pump 50 and motor 10. In one embodiment, the controller 64 may include one or more microprocessors, microcontrollers, digital signal processors ("DSPs"), combinations thereof and/or such other devices known to those having ordinary skill in the art that may be configured to process one or more data and/or parameter signals to provide one or more control signals.

Typical fluid lubrication gaps are most effective when the fluid layer is 1-3 times the valley-to-peak height of the surface roughness of the materials defining the gap. For a machine polished stator/rotor set, the gap may be in the range of 1-5 microns. Typical fluid pressures may be in the range of 1-100 PSI depending on the application, magnetic load and angle of taper of rotor 14 and stator 12.

In other embodiments, ferromagnetic stator and/or rotor sleeves or liners may be used to decrease the coefficient of friction and provide a smoother wear surface. Depending upon the application, liners having a wide range of wall thicknesses may be used. In certain embodiments, liners having a wall thickness of 1-5 mm are preferred. In other embodiments, liners having a wall thickness of 2-3 mm are preferred. Liners according to the present invention may further be modified by decreasing or partially eliminating the wall thickness between the teeth of stator 12 and rotor 14 to decrease flux leakage. In other embodiments, liner channels may also be used to guide fluid lubricants during operation to maintain consistent lubrication. As should also be apparent from the foregoing, liners may be used in conjunction with pump 50 and controller 64 to control lubricant pressure and create a dynamic bearing between rotor 14 and stator 12.

Approximately zero gap operation may result in a decrease in the total magnetic reluctance of the circuit by 50 to more than 100 times; thereby enabling greater torque for a given electrical current in the system. This would enable higher field strength for a given current and greater volumetric torque density. The above-described tapered stator-rotor motor 10 may further enable direct load transfer without the use of secondary bearings or close housing-stator tolerances.

The above-described tapered stator-rotor motor 10 may be manufactured using convention methods, polished using lapping compound as a specific set to further reduce gap 44 and decrease the friction between the surfaces. Tapered rotor 14 of the present invention may comprise a switch reluctance type, an induction type (such as a squirrel cage), a permanent magnet type, or an electrical excited rotor.

Stator teeth 16 of the present invention may be straight, characterized by a cross-sectional area at the terminal end of stator teeth 16 less than or equal to the average cross-sectional area of stator teeth 16, or diffuse, characterized by a cross-sectional area at the terminal end of stator teeth 16 greater than the average cross-sectional area of stator teeth 16. Diffuse stator teeth 16 may enable greater rotor surface area at the expense of decreased stator slot volume for a stator back-iron 21 of a given dimension.

Coil windings 20 of the present invention comprise at least one turn of an electrically conducting wire. Coil windings 20 may preferably comprise multiple turns of an electrically insulated wire, such as copper or aluminum coated magnet wire. Coil windings 20 may be operationally connected into phases using conventional methods, such as soldering, brazing, or welding.

A ferromagnetic stator core of the present invention may comprise a solid ferromagnetic material, such as iron, iron alloy, iron oxide, ceramic, such as ferrite, a composite ferromagnetic material, such as plastic-ferrite composite, metal-matrix composite, or iron powder composite, or a planar ferromagnetic material, such as laminated steel. These materials may be patterned using conventional methods, such as machining, die stamping, or laser cutting, and may be assembled as needed using conventional methods, such as welding.

A ferromagnetic stator core may be wound with insulated electrical wire, such as coated magnet wire, around stator teeth 16 using conventional methods, or in a poloidal orientation, by first winding all of the wire for a given winding around a bobbin. The bobbin may either be sufficiently small to pass through the interior of stator 12, or sufficiently large to encircle the ferromagnetic stator core prior to being wound, as is typical in toroidal solenoid winding machines. The wire may then be unwound from the bobbin around stator back-iron 21 and between stator teeth 16 until the desired number of turns is reached.

A ferromagnetic stator core according to one embodiment of the present invention may comprise a plurality of radial segments separated at stator back-iron 21 that may be assembled through hollow pre-wrapped wire bobbins, or prewrapped stator teeth, similar to a DC starter motor. This embodiment would enable rapid and scalable electric motor stator assembly at the expense of decreased structural properties.

A tapered electric motor/generator 10 may be driven using conventional electric drivers and may transmit mechanical power using conventional methods as described above. Operation using conventional drivers may require greater parallel wiring than conventional methods to decrease the total system current and compensate for the increased back EMF.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present invention as come within known or customary practice in the art to which this invention pertains.

What is claimed is:

1. An electric motor, comprising:
   a ferromagnetic stator comprising a plurality of stator teeth each having a mating surface; and
   a rotor having a plurality of mating surfaces that cooperate with the mating surfaces of the stator teeth;
   wherein the mating surfaces of the plurality of stator teeth and the plurality of mating surfaces of the rotor are tapered along a central axis of the stator and the rotor; and
   wherein one of the stator and the rotor is configured to move along the central axis as a result of thermal expansion to maintain a substantially equal gap between the mating surfaces of the plurality of stator teeth and the plurality of mating surfaces of the rotor during operation.

2. The electric motor of claim 1, further comprising a spring coupled to the one of the stator and the rotor configured to move along the central axis, the spring applying a biasing force against the one of the stator and the rotor to inhibit movement along the central axis.

3. The electric motor of claim 1, wherein the mating surfaces of the plurality of stator teeth define a first inner diameter at a first end of the stator and a second inner diameter at a second end of the stator, the first inner diameter being smaller than the second inner diameter.

4. The electric motor of claim 3, wherein the plurality of mating surfaces of the rotor define a first outer diameter at a first end of the rotor and a second outer diameter at a second end of the rotor, the first outer diameter being smaller than the second outer diameter.

5. The electric motor of claim 1, wherein a plurality of fluted surfaces are alternately disposed between the plurality of mating surfaces of the rotor.

6. The electric motor of claim 1, further comprising a lubricant disposed in the gap between the mating surfaces of the plurality of stator teeth and the plurality of mating surfaces of the rotor.

7. The electric motor of claim 6, wherein the lubricant is a dry lubricant comprising one of WS2, MoS2 and graphite.

8. The electric motor of claim 1, wherein the stator further comprises a back-iron, the plurality of stator teeth protruding radially from the back-iron.

9. The electric motor of claim 8, wherein the stator teeth are oriented substantially perpendicular to the central axis.

10. The electric motor of claim 1, wherein the taper of the mating surfaces of the plurality of stator teeth and the plurality of mating surfaces of the rotor is at an angle relative to the central axis within a range of 5 to 85 degrees.

11. The electric motor of claim 10, wherein the angle of the taper is within a range of 10 to 80 degrees.

12. The electric motor of claim 1, wherein the gap is less than approximately 5 microns.

13. An electric motor, comprising:
a stator having a plurality of teeth separated by a plurality of coil windings wound around a back-iron, the plurality of teeth together defining a curved, inner mating surface that tapers from a large diameter end of the stator to a small diameter end of the stator; and
a rotor having a plurality of mating surfaces that together define a curved, outer mating surface that tapers from a large diameter end of the rotor to a small diameter end of the rotor, the rotor being mounted within the stator such that the outer mating surface of the rotor and the inner mating surface of the stator form a gap having a width;
wherein the rotor is configured to rotate within the inner mating surface of the stator about a central axis and to move along the central axis away from the small diameter end of the stator as heat causes the outer mating surface to expand radially from the central axis, the movement of the rotor away from the small diameter end of the stator being sufficient to compensate for the expansion of the outer mating surface and maintain the width of the gap.

14. The electric motor of claim 13, further comprising a spring coupled to the rotor to bias the rotor toward the small diameter end of the stator.

15. The electric motor of claim 13, further comprising a lubricant disposed in the gap.

16. The electric motor of claim 13, wherein the plurality of stator teeth protrude radially from the back-iron toward the central axis.

17. The electric motor of claim 13, wherein the inner mating surface and the outer mating surface taper at an angle relative to the central axis within a range of 10 to 80 degrees.

18. A system, comprising:
a motor comprising a stator and a rotor mounted relative to the stator to form a gap between a surface of the stator and a surface of the rotor, the gap having a width;
one of the stator and the rotor being mounted for movement relative to the other of the stator and the rotor along a central axis in response to thermal expansion of at least one of the stator and the rotor;
a pump having an output in fluid communication with the gap, the pump delivering a fluid lubricant to the gap to maintain the width of the gap.

19. The system of claim 18, wherein the surface of the stator tapers from one end of the stator to another end of the stator and the surface of the rotor tapers from one end of the rotor to another end of the rotor.

20. The system of claim 18, further comprising a controller configured to receive a pressure measurement of the fluid lubricant and to control operation of the pump in response to the pressure measurement.

21. The system of claim 18, wherein the rotor includes at least one groove on the surface of the rotor, the groove being in fluid communication with the gap.

* * * * *